(12) United States Patent
Dang et al.

(10) Patent No.: US 9,117,489 B1
(45) Date of Patent: Aug. 25, 2015

(54) DATA STORAGE DEVICE SCREENING HEADS BY VERIFYING DEFECTS AFTER DEFECT SCAN (71) Applicant: Western Digital Technologies, Inc., Irvine, CA (US)

(72) Inventors: Dean V. Dang, Fountain Valley, CA (US); Chun Sei Tsai, Tustin, CA (US); Chirag C. Patel, Rancho Santa Margarita, CA (US); Ammar A. Zayed, Foothill Ranch, CA (US); Carl E. Barlow, Lake Forest, CA (US); Thao Hieu Banh, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/182,965

(22) Filed: Feb. 18, 2014

(51) Int. Cl.
G11B 27/36 (2006.01)
G11B 20/18 (2006.01)
G11B 5/09 (2006.01)

(52) U.S. Cl.
CPC .................. *G11B 20/18* (2013.01); *G11B 5/09* (2013.01); *G11B 27/36* (2013.01); *G11B 2220/20* (2013.01)

(58) Field of Classification Search
None
See application file for complete search history.

(56) References Cited

U.S. PATENT DOCUMENTS

| 5,233,486 | A | * | 8/1993 | Albert | ........................ 360/77.04 |
|---|---|---|---|---|---|
| 5,654,854 | A | | 8/1997 | Mallary | |
| 6,018,789 | A | | 1/2000 | Sokolov et al. | |
| 6,065,095 | A | | 5/2000 | Sokolov et al. | |
| 6,078,452 | A | | 6/2000 | Kittilson et al. | |
| 6,081,447 | A | | 6/2000 | Lofgren et al. | |
| 6,092,149 | A | | 7/2000 | Hicken et al. | |
| 6,092,150 | A | | 7/2000 | Sokolov et al. | |
| 6,094,707 | A | | 7/2000 | Sokolov et al. | |
| 6,105,104 | A | | 8/2000 | Guttmann et al. | |
| 6,111,717 | A | | 8/2000 | Cloke et al. | |
| 6,145,052 | A | | 11/2000 | Howe et al. | |
| 6,175,893 | B1 | | 1/2001 | D'Souza et al. | |
| 6,178,056 | B1 | | 1/2001 | Cloke et al. | |
| 6,191,909 | B1 | | 2/2001 | Cloke et al. | |
| 6,195,218 | B1 | | 2/2001 | Guttmann et al. | |
| 6,205,494 | B1 | | 3/2001 | Williams | |
| 6,208,477 | B1 | | 3/2001 | Cloke et al. | |
| 6,223,303 | B1 | | 4/2001 | Billings et al. | |
| 6,230,233 | B1 | | 5/2001 | Lofgren et al. | |
| 6,246,346 | B1 | | 6/2001 | Cloke et al. | |
| 6,249,393 | B1 | | 6/2001 | Billings et al. | |
| 6,256,695 | B1 | | 7/2001 | Williams | |
| 6,262,857 | B1 | | 7/2001 | Hull et al. | |
| 6,263,459 | B1 | | 7/2001 | Schibilla | |
| 6,272,694 | B1 | | 8/2001 | Weaver et al. | |
| 6,278,568 | B1 | | 8/2001 | Cloke et al. | |
| 6,279,089 | B1 | | 8/2001 | Schibilla et al. | |
| 6,289,484 | B1 | | 9/2001 | Rothberg et al. | |
| 6,292,912 | B1 | | 9/2001 | Cloke et al. | |

(Continued)

OTHER PUBLICATIONS

James McFadyen, U.S. Appl. No. 13/796,317, filed Mar. 13, 2013, 20 pages.

*Primary Examiner* — Dismery Mercedes (57) ABSTRACT

A data storage device is disclosed comprising a head actuated over a disk comprising a plurality of tracks. A defect scan of at least one of the tracks is executed, and a log entry is generated when a defect is detected. After the defect scan, a verify operation is executed for at least two of the detected defects. A number of times the verify operation detects a false defect is counted, and whether the head is defective is determined based at least partly on the count.

16 Claims, 6 Drawing Sheets

(56) References Cited

U.S. PATENT DOCUMENTS

| | | |
|---|---|---|
| 6,310,739 B1 * | 10/2001 | McEwen et al. ............... 360/25 |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,498,696 B1 | 12/2002 | Salo et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,556,933 B1 | 4/2003 | Sacks et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,650,492 B2 * | 11/2003 | Lenny et al. ............... 360/31 |
| 6,654,193 B1 | 11/2003 | Thelin |
| 6,657,428 B2 | 12/2003 | Kim |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,696,832 B2 * | 2/2004 | Chew et al. ............... 324/210 |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,907,322 B2 | 6/2005 | Ghoshal |
| 6,910,099 B1 | 6/2005 | Wang et al. |
| 6,920,001 B2 | 7/2005 | Chua et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |

(56) References Cited

U.S. PATENT DOCUMENTS

| | | | |
|---|---|---|---|
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,062,698 B2 | 6/2006 | Yang |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,197 B2 * | 9/2006 | Cho ............................ 360/31 |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,184,230 B1 | 2/2007 | Chue et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,365,531 B2 | 4/2008 | Che et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,397,622 B1 | 7/2008 | Liikanen et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,561,368 B2 | 7/2009 | Kim et al. |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,642,789 B2 * | 1/2010 | Yamasaki et al. ............ 324/523 |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 * | 2/2010 | Jin et al. .................... 369/53.15 |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 * | 11/2010 | Dang et al. ...................... 360/31 |
| 7,843,660 B1 | 11/2010 | Yeo |
| 7,848,037 B2 * | 12/2010 | Deng et al. ...................... 360/31 |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 * | 4/2011 | Boyle et al. ...................... 360/53 |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,137 B2 | 8/2011 | Antoku |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 * | 9/2011 | Jin .................................. 360/31 |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |

(56) References Cited

U.S. PATENT DOCUMENTS

| | | |
|---|---|---|
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 * | 6/2012 | Zhang .................... 360/31 |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,747 B1 * | 11/2013 | Yang et al. .................... 360/31 |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,755,136 B1 | 6/2014 | Ng et al. |
| 2002/0118473 A1 * | 8/2002 | Yong .................... 360/31 |
| 2003/0030934 A1 * | 2/2003 | Schaff et al. .................... 360/66 |
| 2003/0065992 A1 | 4/2003 | Yang |
| 2004/0153949 A1 * | 8/2004 | Ro et al. .................... 714/774 |
| 2005/0057835 A1 * | 3/2005 | Kim et al. .................... 360/46 |
| 2007/0279788 A1 * | 12/2007 | Andersen et al. .................... 360/53 |
| 2008/0165444 A1 | 7/2008 | Zafer |
| 2009/0113702 A1 | 5/2009 | Hogg |
| 2010/0306551 A1 | 12/2010 | Meyer et al. |
| 2011/0226729 A1 | 9/2011 | Hogg |
| 2012/0019945 A1 | 1/2012 | Chan et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

DATA STORAGE DEVICE SCREENING HEADS BY VERIFYING DEFECTS AFTER DEFECT SCAN

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
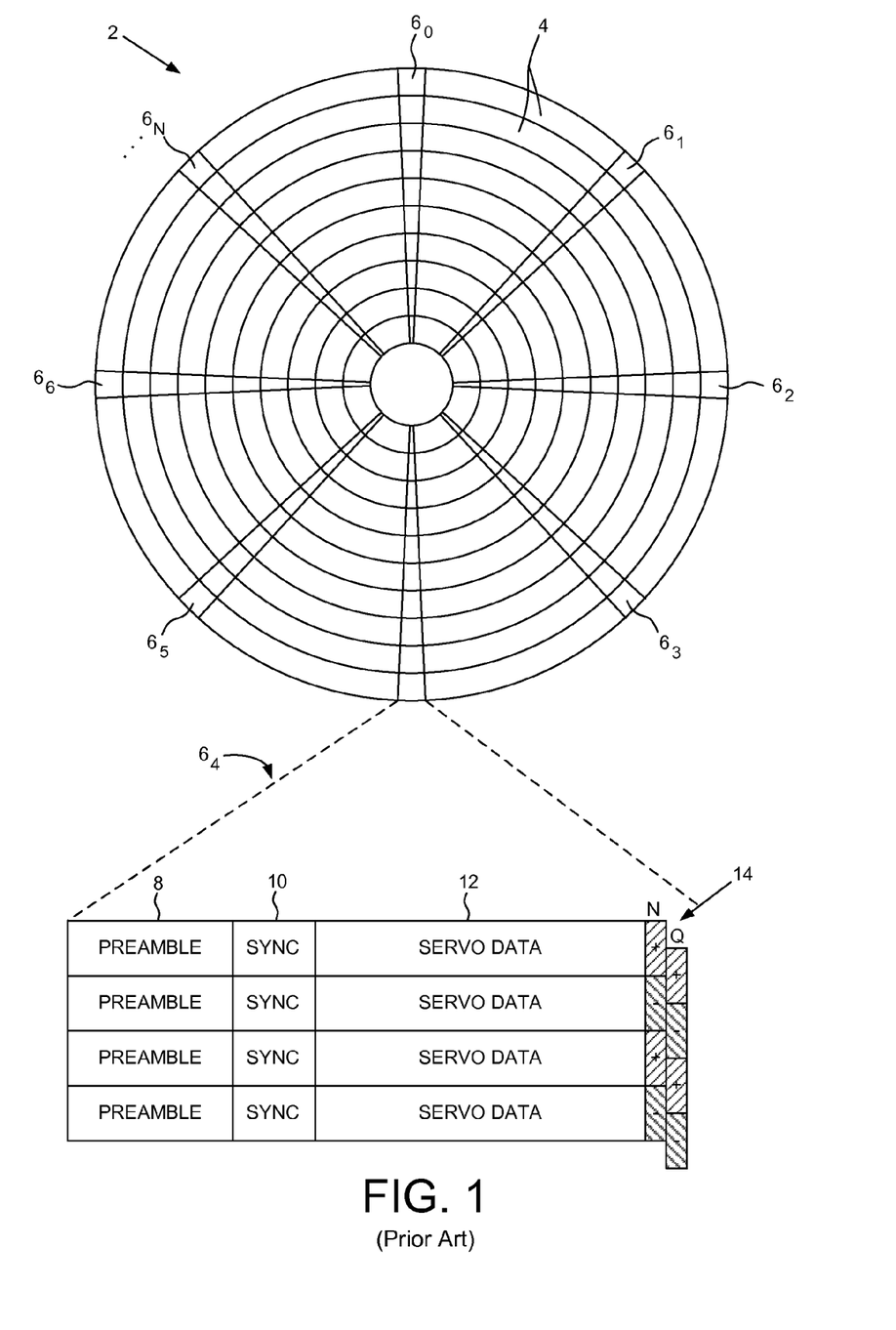
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

DETAILED DESCRIPTION

Figure 2A:
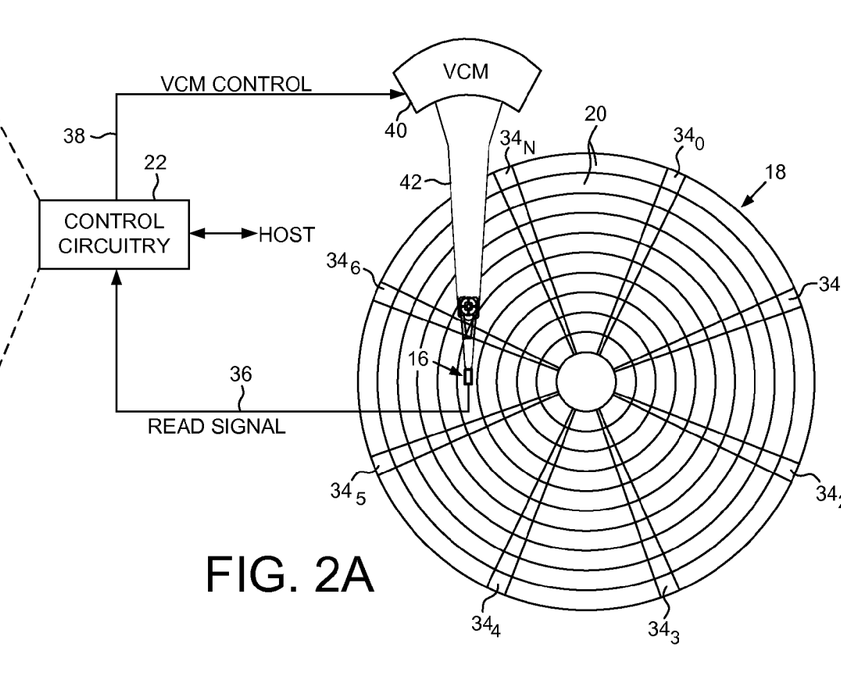
FIG. 2A shows a data storage device in the form of a disk drive according to an embodiment comprising a head actuated over a disk.
Figure 2B:
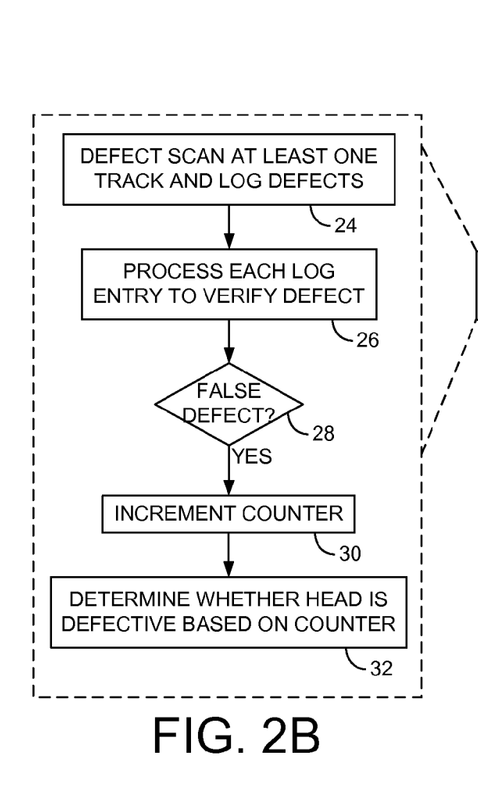
FIG. 2B is a flow diagram according to an embodiment wherein defects detected during a defect scan are verified to determine whether the head is defective.

FIG. 2A shows a data storage device in the form of a disk drive comprising a head 16 actuated over a disk 18 comprising a plurality of tracks 20. The disk drive further comprises control circuitry 22 configured to execute the flow diagram of FIG. 2B wherein a defect scan is executed on at least one of the tracks and a log entry is generated when a defect is detected (block 24). After the defect scan, a verify operation is executed for at least two of the detected defects (block 26). When the verify operation detects a false defect (block 28), a counter is incremented (block 30), and whether the head is defective is determined based at least partly on the counter (block 32).

In the embodiment of FIG. 2A, servo tracks 20 are defined by servo sectors $34_0$-$34_N$, where data tracks may be defined at the same or different radial density than the servo tracks 20. The control circuitry 22 processes a read signal 36 emanating from the head 16 to demodulate the servo sectors $34_0$-$34_N$ and generate a position error signal (PES) representing an error between the actual position of the head and a target position relative to a target track. A servo control system in the control circuitry 22 filters the PES using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
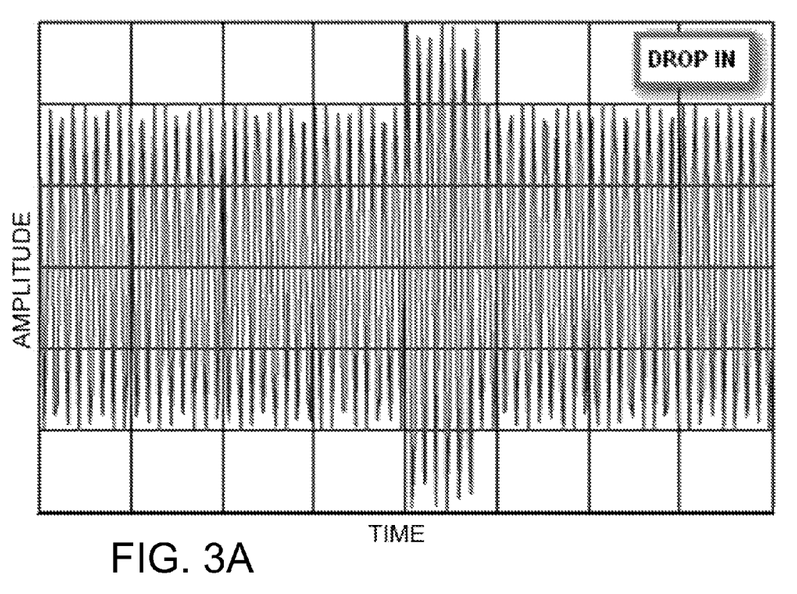
FIG. 3A shows an example drop-in defect on the disk according to an embodiment.
Figure 3B:
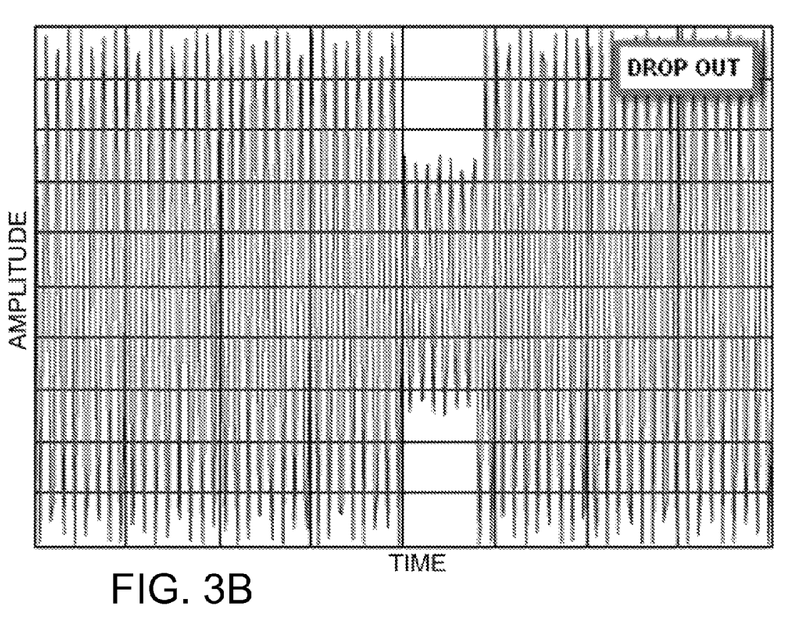
FIG. 3B shows an example drop-out defect on the disk according to an embodiment.

Any suitable defect scan operation may be executed to detect defects on the disk 18. In one embodiment, the defect scan comprises writing a periodic pattern (e.g., a 2T pattern) to the disk 18, and then reading the periodic pattern to evaluate the resulting sinusoidal read signal 36. The periodic pattern may be written to any suitable segment on the disk, such as a data sector of a data track, or a "wedge" comprising the segment of a track between consecutive servo sectors. In the absence of a defect, the sinusoidal read signal 36 will exhibit an expected amplitude and phase. When the head 16 passes over a defect, the defect will induce a disturbance in the sinusoidal read signal. FIG. 3A illustrates an example disturbance in the sinusoidal read signal due to a drop-in defect, and FIG. 3B illustrates a disturbance in the sinusoidal read signal due to a drop-out defect. In one embodiment, the drop-in defect and the drop-out defect may be detected by comparing the amplitude of the read signal 36 to corresponding thresholds as described in greater detail below.

FIGS. 4A-4F show various embodiments of control circuitry 22 for detecting a defect on the disk, including various defect thresholds which may be configured to any suitable value as well as increased or decreased in order to tune the defect detection accuracy. In one embodiment, the control circuitry 22 implements a single defect detector, and in an alternative embodiment, the control circuitry 22 implements multiple defect detectors that operate in parallel.

Figure 4A:
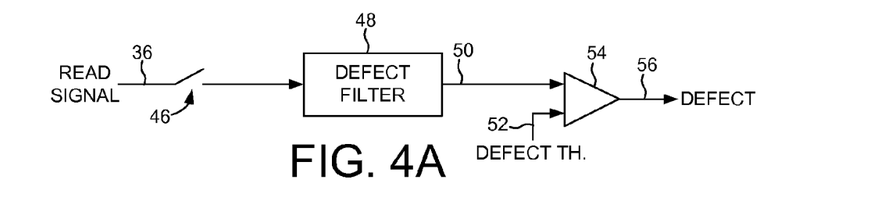
FIGS. 4A-4F show embodiments for detecting defects on the disk according to various embodiments.
Figure 4B:
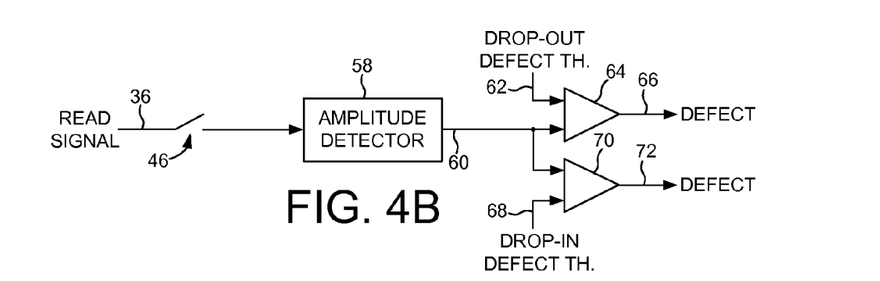
Figure 4C:
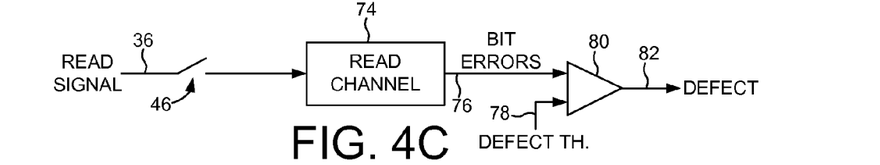
Figure 4D:
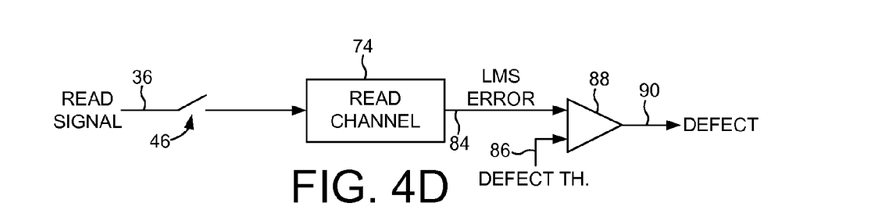
Figure 4E:
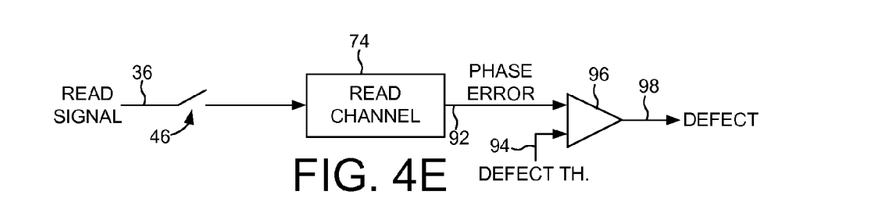
Figure 4F:
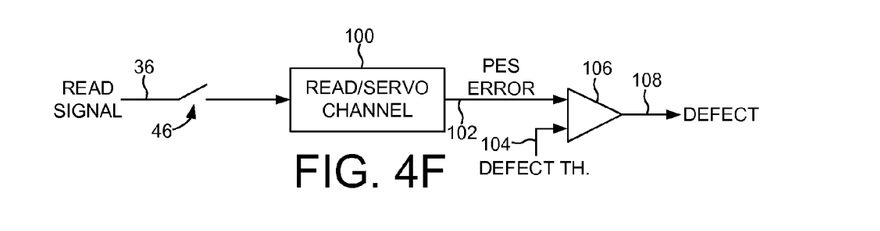

In the embodiment of FIG. 4A, the read signal 36 is sampled 46, and the read signal samples filtered by a defect filter 48 having an impulse response matched to a defect signature. When the output 50 of the defect filter 48 exceeds a defect threshold 52 at comparator 54, the defect 56 is detected. In the embodiment of FIG. 4B, the control circuitry 22 comprises an amplitude detector 58 which processes the read signal samples to detect deviations in the amplitude of the read signal. When the output 60 of the amplitude detector 58 falls below a drop-out defect threshold 62 at comparator 64, a drop-out defect 66 is detected. When the output 60 of the amplitude detector 58 rises above a drop-in defect threshold 68 at comparator 70, a drop-in defect 72 is detected. In the embodiment of FIG. 4C, the control circuitry 22 comprises a read channel 74 including a digital data detector for detecting an estimated data sequence from the read signal samples. A number of bit errors 76 is generated relative to the estimated data sequence and the correct data sequence (e.g., by comparing the estimated data sequence to a known data sequence, or by using an error correction code). When the number of bit errors 76 (or symbol errors) exceeds a defect threshold 78 at comparator 80, a defect 82 is detected. In the embodiment of FIG. 4D, the read channel 74 comprises suitable circuitry for generating a least mean square (LMS) error 84 between the read signal samples and expected signal samples. When the LMS error 84 exceeds a defect threshold 86 at comparator 88, a defect 90 is detected. Any suitable component in the read channel 74 may be employed to detect a defect. In the embodiment of FIG. 4E, a phase error 92 is generated by timing recovery circuitry which synchronizes to the read signal samples (e.g., using a phase-locked loop). When the phase error 92 exceeds a defect threshold 94 at comparator 96, a defect 98 is detected. In the embodiment of FIG. 4F, the control circuitry 22 comprises a read channel 100 including servo demodulation circuitry for demodulating the embedded servo sectors $34_0$-$34_N$ to generate a position error signal (PES) 102 representing a radial offset of the head 16 from a target track 20. When the PES 102 exceeds a defect threshold 104 at comparator 106, a defect 108 is detected in one or more of the servo sectors.

Regardless as to how a defect on the disk 18 is detected, in one embodiment when a defect is detected it may be due to a defect in the read element of the head 16 rather than to an actual defect on the disk. For example, in one embodiment the head 16 may comprise a magnetoresistive (MR) read element which exhibits a change in resistance in the presence of the magnetic field emanating from the disk, for example, when reading a periodic pattern from the disk during the defect scan. An MR read element may exhibit a defect referred to as baseline popping which is a form of instability (resistance change) due to structural damage, scratches on the active pole, pin layer damage, or improper application of the bias current or voltage. In one embodiment, the read element may exhibit a defective response (e.g., baseline popping) sporadically. Therefore if the control circuitry 22 executed a suitable manufacturing test of the read element to determine whether the head is defective, it may take an extensive amount of time to accurately make the determination. The read element may be stressed in order to expedite the manufacturing test, such as by increasing the bias applied to an MR read element, but stressing the read element may itself damage the read element rendering it defective.

Figure 5A:
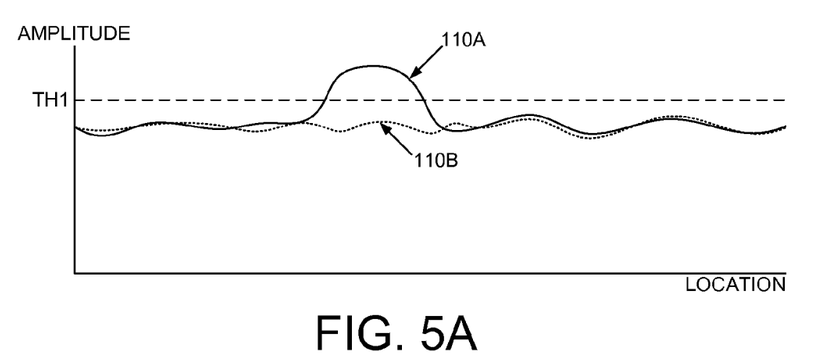
FIG. 5A shows an embodiment wherein a drop-in defect detected during the defect scan is determined to be a false defect when verified after the defect scan.
Figure 5B:
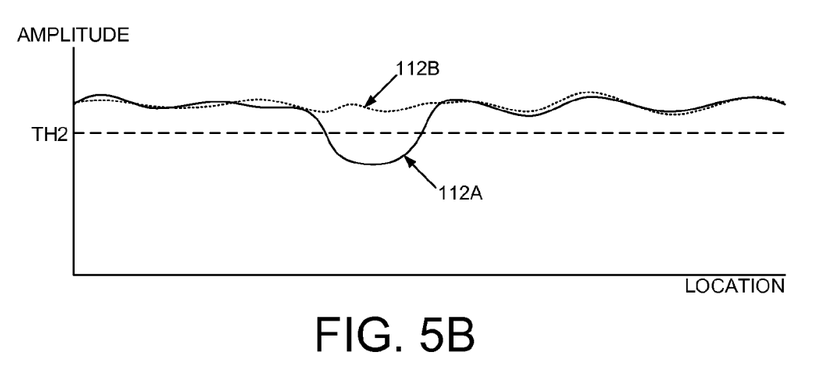
FIG. 5B shows an embodiment wherein a drop-out defect detected during the defect scan is determined to be a false defect when verified after the defect scan.

Accordingly, in one embodiment the read element of the head 16 may be evaluated by evaluating the result of a defect scan of the disk. Since the defect scan is typically executed over substantially the entire disk surface, it increases the probability of detecting the sporadic occurrence of read element malfunctions by verifying the detected defects after the defect scan. That is, if a defect detected during the normal defect scan is not again detected during the verification scan, it may be assumed that the detected defect was due to a read element malfunction rather than due to a defect on the disk. This is illustrated in the example of FIG. 5A where during the initial defect scan, a drop-in defect may be detected when the amplitude 110A of the read signal 36 rises above a threshold Th1. During the verification scan, the same area of the disk is read again, and since the resulting amplitude of the read signal 110B does not rise above the threshold Th1, the initially detected defect is considered a false defect not caused by a drop-in defect on the disk but instead caused by a malfunctioning read element. In one embodiment, an initial defect may be scanned multiple times and/or the threshold Th1 adjusted during the verification scan to improve the accuracy in detecting false defects. FIG. 5B shows another example where a drop-out defect may be detected during the initial defect scan when the amplitude 112A of the read signal 36 falls below a threshold Th2. During the verification scan, the same area of the disk is read again, and since the resulting amplitude of the read signal 112B does not fall below the threshold Th2, the initially detected defect is considered a false defect not caused by a drop-out defect on the disk but instead caused by a malfunctioning read element. In one embodiment, when the number of false defects detected during the verification scan exceeds a threshold, the head is determined to be defective and either replaced or disabled (depopulated) in a multi-platter disk drive.

In one embodiment, during the defect scan the signature in the read signal corresponding to a malfunctioning read element may resemble a particular type of defect on the disk. For example, the signature caused by baseline popping of an MR read element may resemble the drop-in defect shown in FIG. 3A. Accordingly, in one embodiment only particular types of defects that are logged during the defect scan may be evaluated during the verification scan. An example of this embodiment is illustrated in the flow diagram of FIG. 6 wherein during a defect scan of multiple tracks on the disk (block 114), when a defect is detected (block 116) a drop-in counter is incremented (block 118) when a drop-in defect is detected (block 117), and a drop-out counter is incremented (block 122) when a drop-out defect is detected (block 120). Other types of defects may be detected with a corresponding counter incremented for each defect type. At block 124 the flow diagram is repeated from block 116 until several of the tracks (e.g., all of the tracks) have been scanned for defects.

Figure 6:
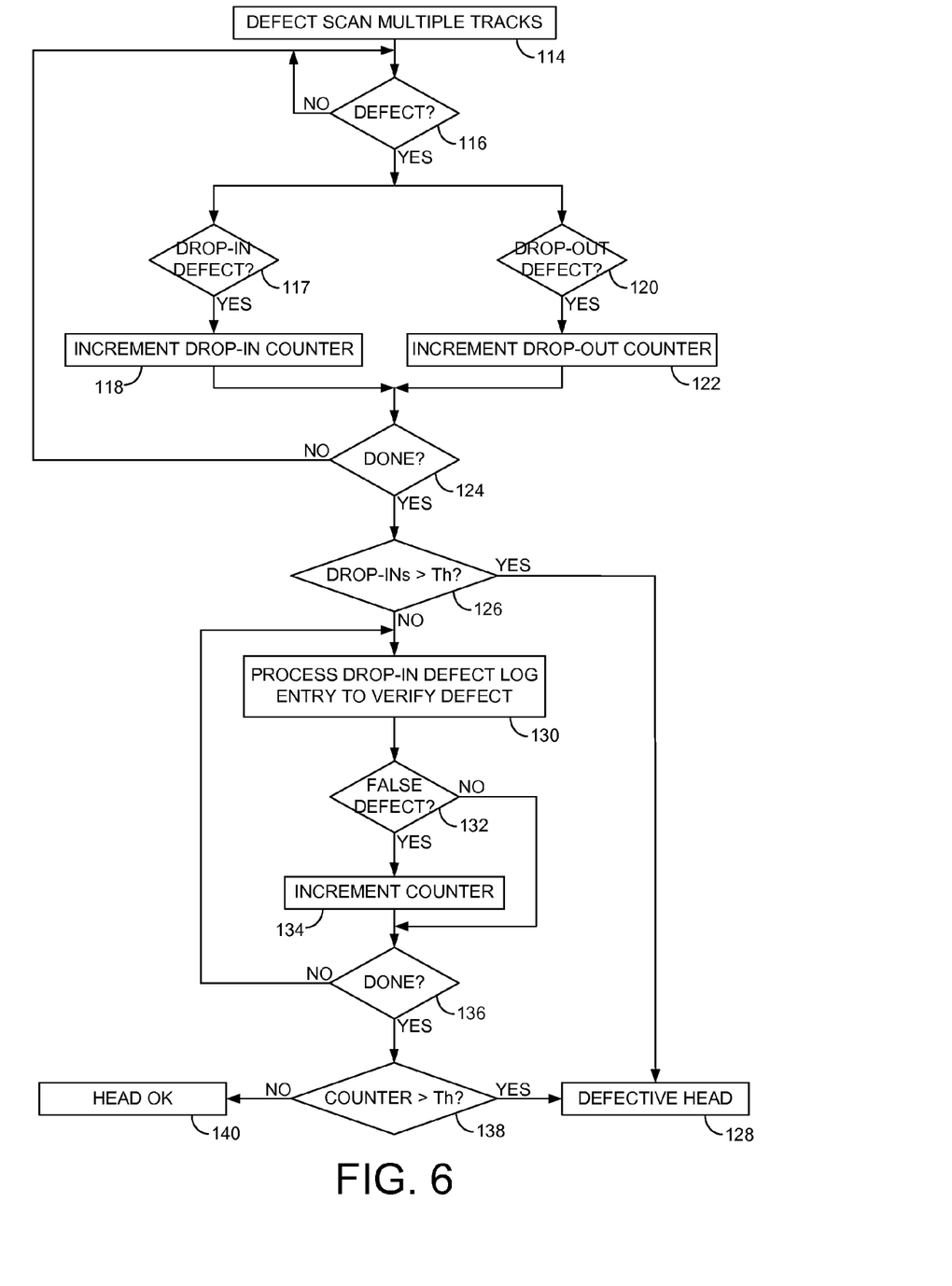
FIG. 6 is a flow diagram according to an embodiment wherein if the number of drop-in defects detected during the defect scan exceeds a threshold, the head is assumed to be defective.

If after the defect scan the drop-in counter exceeds a threshold (block 126), the head is determined to be defective (block 128) without performing the verification scan. That is, if there is an excessive number of drop-in defects detected during the defect scan, it is assumed that a significant number of the drop-in defects were caused by a malfunctioning read element and therefore the head is assumed to be defective without needing to perform the verification scan. If the number of drop-in defects is less than the threshold at block 126, then each drop-in defect in the defect log is processed during the verification scan (block 130). When a false drop-in defect is detected during the verification scan (block 132), a false defect counter is incremented (block 134). When all of the drop-in defects have been evaluated (block 136), the false defect counter is compared to a threshold (block 138). If the false defect counter exceeds the threshold, the head is determined to be defective (block 128); otherwise the head passes the verification scan (block 140). In one embodiment, the false defect counter may exceed the threshold during the verification scan and therefore the verification scan may terminate early since the head can be declared defective as soon as the false defect counter exceeds the threshold at block 136. Similarly, the initial defect scan may terminate early if the number of drop-in defects exceeds the threshold since the head may be declared defective as soon as the drop-in counter exceeds the threshold at block 126.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks;
   a head; and
   control circuitry configured to:
   defect scan at least one of the tracks and generate a log entry when a defect is detected;
   after the defect scan, execute a verify operation for at least two of the detected defects;
   count a number of times the verify operation detects a false defect; and
   determine whether the head is defective based at least partly on the count.

2. The data storage device as recited in claim 1, wherein the control circuitry is further configured to generate the log entry when a target defect type is detected.

3. The data storage device as recited in claim 2, wherein the count corresponds to a number of times the target defect type is falsely detected.

4. The data storage device as recited in claim 3, wherein the target defect type comprises a drop-in defect.

5. The data storage device as recited in claim 3, wherein the control circuitry is further configured to determine whether the head is defective based on a total number of log entries generated during the defect scan.

6. The data storage device as recited in claim 5, wherein the control circuitry is further configured to determine the head is defective when the total number of log entries exceeds a threshold.

7. The data storage device as recited in claim 5, wherein the control circuitry is further configured to determine the head is defective when the total number of log entries corresponding to a target defect type exceeds a threshold.

8. The data storage device as recited in claim 7, wherein the target defect type comprises a drop-in defect.

9. A method of operating a data storage device, the method comprising:
   defect scanning at least one track of a disk and generating a log entry when a defect is detected;
   after the defect scan, executing a verify operation for at least two of the detected defects;
   counting a number of times the verify operation detects a false defect; and
   determining whether a head is defective based at least partly on the count.

10. The method as recited in claim 9, further comprising generating the log entry when a target defect type is detected.

11. The method as recited in claim 10, wherein the count corresponds to a number of times the target defect type is falsely detected.

12. The method as recited in claim 11, wherein the target defect type comprises a drop-in defect.

13. The method as recited in claim 11, further comprising determining whether the head is defective based on a total number of log entries generated during the defect scan.

14. The method as recited in claim 13, further comprising determining the head is defective when the total number of log entries exceeds a threshold.

15. The method as recited in claim 13, further comprising determining the head is defective when the total number of log entries corresponding to a target defect type exceeds a threshold.

16. The method as recited in claim 15, wherein the target defect type comprises a drop-in defect.

* * * * *